United States Patent [19]

Wedman et al.

[11] 4,456,934

[45] Jun. 26, 1984

[54] LINEAR POSITIONING SYSTEM

[75] Inventors: Leonard N. Wedman, Radford, Va.; Joseph A. Bourque, Saratoga, Calif.

[73] Assignee: Kollmorgen Technologies Corporation, Dallas, Tex.

[21] Appl. No.: 376,657

[22] Filed: May 10, 1982

[51] Int. Cl.³ .................. G11B 21/08; G11B 21/10; G05B 11/00; H02K 41/00
[52] U.S. Cl. ......................... 360/78; 310/12; 318/135; 318/594; 318/596; 318/601; 318/652; 318/662; 318/671; 318/687; 335/234; 360/77; 360/106
[58] Field of Search .............. 179/114 M; 381/96; 360/77, 78, 106; 335/229, 234; 310/12, 13, 14; 318/135, 592, 594, 596, 597, 601, 652, 662, 671, 687

[56]  References Cited

U.S. PATENT DOCUMENTS

| | | | |
|---|---|---|---|
| 1,226,697 | 5/1917 | Rinsche | 335/262 |
| 1,436,639 | 11/1922 | Bindschedler | 335/262 |
| 2,939,055 | 5/1960 | Gebhart | 335/266 |
| 2,942,163 | 6/1960 | Morrison | 335/223 |
| 3,130,331 | 4/1964 | Jallen et al. | 310/14 |
| 3,135,880 | 6/1964 | Olson et al. | 310/14 |
| 3,268,841 | 8/1966 | Wakshull et al. | 335/266 |
| 4,259,602 | 3/1981 | Kuribayashi et al. | 310/12 |
| 4,260,914 | 4/1981 | Hertrich | 310/27 |

OTHER PUBLICATIONS

The Farrand High Gain Inductosyn® Transducer Pamphlet T-HGI-29.
Farrand Controls, Division of Farrand Industries, Inc., 99 Wall Street, Valhalla, NY 10595.

*Primary Examiner*—George G. Stellar
*Attorney, Agent, or Firm*—Morgan, Finnegan, Pine, Foley & Lee

[57]  ABSTRACT

A linear servo system including a linear motor with a moving permanent magnet the flux of which interacts with current flow through a stator winding. A position servo loop controls the position of the permanent magnet and preferably includes a position transducer located within the motor air gap. The servo system when used in combination with a disk drive preferably includes a coarse/fine positioning program to first move to the desired disk track area and to then move to the center of the disk track. The motor winding located in the air gap can be made of iron or copper clad iron to reduce the size of the effective air gap.

18 Claims, 8 Drawing Figures

LINEAR POSITIONING SYSTEM

This invention relates to linear positioning systems and, more particularly, to linear positioning systems including a moving magnet motor.

BACKGROUND OF THE INVENTION

Linear positioning systems find uses in a wide variety of devices. In some cases such as in computer associated magnetic disk drives for positioning the read/write heads the requirements are particularly severe as far as actuation time and positioning accuracy are concerned. In computer systems utilizing disk drives lost positioning time can impair the overall computer performance and, thus, must be kept to a minimum. Positioning accuracy and repeatability determines the number of recording tracks that can exist on a disk and, therefore, directly affects the data packing density. Accordingly, the linear positioning system in a disk drive must operate at high speed as well as high accuracy.

A common prior technique used in disk drives included the use of a rotary stepping motor in combination with a lead screw arrangement to form a linear stepper. Such linear steppers are usually operated open loop and provide satisfactory results when repeatability constraints are not severe. However, in the better grade disk drives repeatability and positioning accuracy on the order of $0.3 \times 10^{-3}$ inches or better is required. Linear steppers operating open loop and made using conventional manufacturing techniques normally cannot meet these requirements.

Linear induction motor systems have been proposed operating in a closed loop positioning mode. However, such systems are not easily implemented because of the need for a slip angle between the stator moving field and the moving induction unit in order to generate force. An accurate system with slip angle control becomes costly and complex and, even then, is difficult to operate with precision.

Another common technique has relied upon a moving coil actuator in a closed loop control system. Such systems are capable of relatively fast response and good accuracy. However, they are costly and generally not suited for high volume production. In such systems the moving coil is relatively large in diameter and therefore suitable for large disk file systems but not for the smaller disk drives of the type generally used with flexible recording diskettes. Furthermore, the moving coil systems have inherently poor heat dissipation and, therefore, difficulties are experienced with a rapid succession of movements.

An object of the linear positioning system according to this invention is to provide a system having a relatively fast response and high degree of positioning accuracy and repeatability.

Another object is to provide a linear positioning system suitable for high volume production at a moderate cost.

Another object is to provide a linear positioning system having good heat dissipation so that a rapid succession of movements can readily be achieved.

Another object is to provide a linear positioning system having a low profile suitable for use in compact disk drives.

SUMMARY OF THE INVENTION

The system according to the invention utilizes a linear motor including a moving permanent magnet disposed to interact with current flow through a bobbin wound stator winding. Since the moving part is a permanent magnet, there is no need for flexible energizing leads, sliding contacts, or the like in this motor design. The energization for the motor is achieved via a stationary coil and, therefore, the coil structure can be arranged to achieve effective heat dissipation. Furthermore, all the elements of the linear motor are such that the components are relatively flat and the motor therefore can achieve a low profile.

The linear motor is servo controlled to achieve a rapid response and good positioning accuracy. The actual position of the moving element is indicated by a position transducer having the moving part secured to the permanent magnet. Preferably, the positioning transducer is mounted on the permanent magnet itself within the air gap so there is virtually no compliance between the actual position and the indication thereof by the position transducer. The servo loop is preferably of the type operating on a coarse/fine program, moving first to the region of the desired magnetic track on the disk and then moving to a fine position at the center of the track.

As previously mentioned, the moving permanent magnet flux interacts with the current flow through stator windings and, therefore, the winding is located within the magnetic air gap. In accordance with another preferred embodiment, the energizing coil is made of iron or of copper clad iron. Although the iron conductors increase resistivity of the coil, this adverse effect is more than offset by the decrease in reluctance across the air gap and the better magnetic motor characteristics achieved thereby.

DETAILED DESCRIPTION

Figure 1:
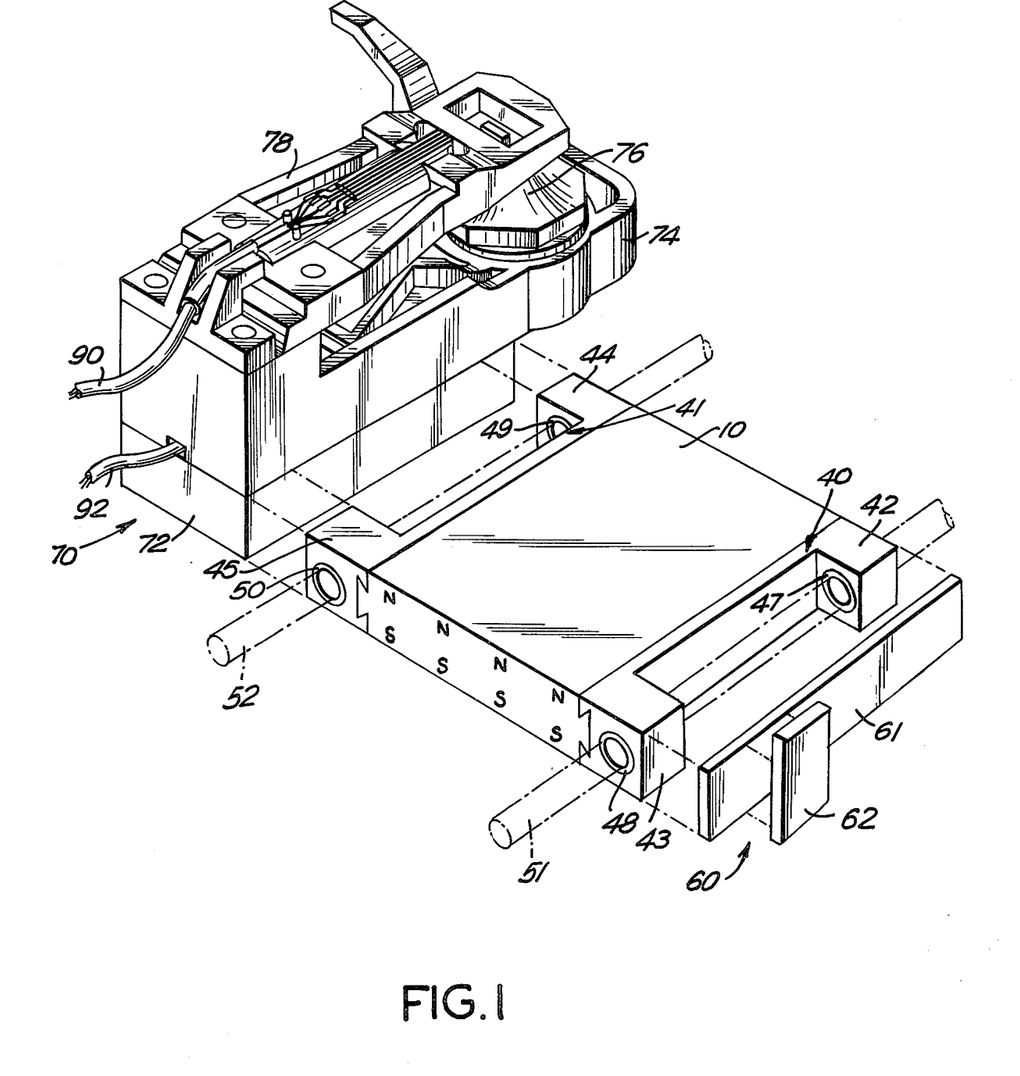
FIG. 1 is a perspective view illustrating the moving permanent magnet of the linear motor used in the system according to the invention together with the linear carriage for the magnet.
Figure 2:
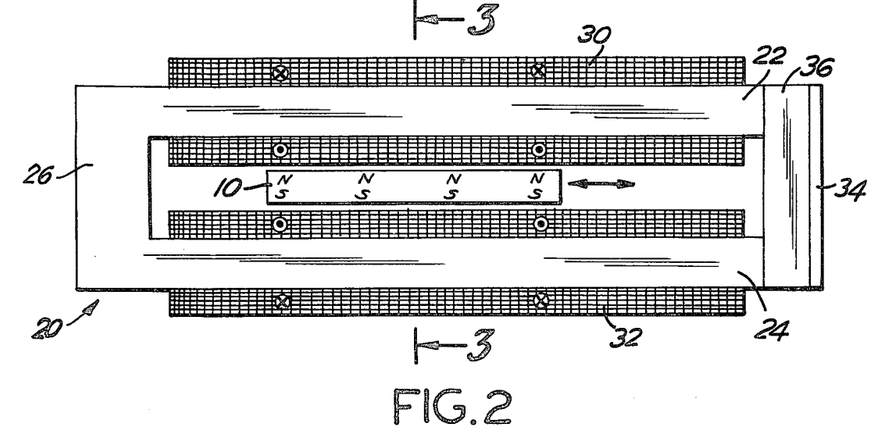
FIG. 2 is a longitudinal cross sectional view of the linear motor portion of the invention.
Figure 3:
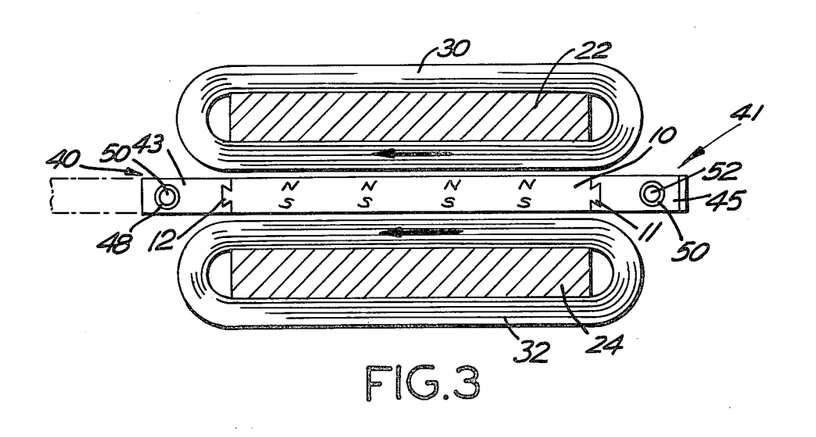
FIG. 3 is a cross-section view taken at position 3—3 in FIG. 2.

FIGS. 1–3 illustrate one embodiment of the linear motor used in the system according to the invention. The moving element includes a permanent magnet 10 magnetized transversely of the direction of movement, i.e., top to bottom as shown in FIG. 1.

The stator portion shown in FIGS. 2 and 3 includes a U-shaped core 20 with parallel legs 22 and 24 connected by a bridge portion 26. Legs 22 and 24 extend in the direction parallel to the axis of movement. The core is made of magnetic material and can be sintered iron or laminated iron depending on the eddy current and hysteresis characteristics required. The magnetic flux of permanent magnet 10 emerges from the north pole surface (top of the magnet as shown in FIG. 2), crosses the air gap and then passes through leg 22, bridge portion 26, and leg 24, back across the air gap to the south pole surface of the magnet.

The legs of the core are surrounded by bobbin type windings 30 and 32. The windings are interconnected with one another so that current flows clockwise around one leg and counter-clockwise around the other. With this connection, current flow in both windings is in the same direction for the portion within the air gap between legs 22 and 24. As viewed in FIG. 2 the current flow is toward the viewer on the portion within the air gap and, as viewed in FIG. 3, is from right to left as indicated by the arrows. As seen in FIG. 3 the windings are relatively flat so as to minimize the air gap between magnet 10 and legs 22 and 24. The overall structure, as seen in FIG. 3, including relatively flat windings, core structure and permanent magnets, results in a linear motor having a low profile.

The force moving the magnet in the longitudinal direction as indicated by the double headed arrow in FIG. 2 results from the interaction of the magnetic flux from magnet 10 and the current flow through the conductors within the air gap. The force generated is the product of the flux density of the permanent magnet, multiplied by the current in the winding and the effective length of the winding within the air gap.

When windings 30 and 32 are energized, they generate a magnetic flux in core 20 which has no useful effect on creating the linear movement. Accordingly, care should be taken to increase the reluctance of the path for this magnetic flux while at the same time not adversely affecting the reluctance of the path used by the flux from the permanent magnet. This is achieved by not magnetically closing the core structure between legs 22 and 24 at one end. To minimize fringing fields, however, a thin magnetic plate 34 is placed across the open end of the core but is separated from the ends of legs 22 and 24 by a nonmagnetic spacer 36. Spacer 36 is of a thickness selected to provide sufficient reluctance in the loop to avoid magnetic saturation from the winding flux.

The permanent magnet is preferably of a high energy type suitable for operation with a relatively large air gap sufficient to accommodate the windings of the motor. Preferably the permanent magnet is made from a samarium cobalt compostion sintered to form the desired magnet shape. Such magnets are known for their high energy and high coercive force characteristics ideal for large size air gap magnetic devices. As shown in FIGS. 1 and 3, the permanent magnet is magnetized so that the direction of flux is perpendicular to the direction of movement.

Windings 30-32 can be conventional windings made of copper wire. However, since a portion of each winding is located in the air gap, i.e., between leg 22 and magnet 10 and between leg 24 and magnet 10, the air gap is relatively large in order to accommodate the winding. The effective air gap however can be reduced by using magnetic material in the windings. This is accomplished by contructing the windings using iron conductors or, preferably, copper clad iron conductors. Since most of the current in a pulsed winding tends to flow near the surface of the conductor, the use of copper at the surface has the greatest effect. The use of iron conductors results in less desirable inductance characteristics, but these effects are more than offset by improvements resulting from reduced reluctance in the magnetic circuit across the air gap.

Carriage supports 40 and 41 are secured to the sides of the permanent magnet through dovetail slots which mate with the dovetail projections 11 and 12 on the magnet. Support 40 includes a pair of outwardly extending bearing projections 42 and 43 and, similarly, support 41 includes a pair of outwardly extending bearing projections 44 and 45. Projections 42-45 each include an aperture therein dimensioned to accommodate linear bearings 47-50 which cooperate with guide rods 51 and 52. The guide rods are suitably secured and positioned so that the permanent magnet and the carriage structure can move linearly between legs 22 and 24 (FIG. 2) of the linear motor. In the embodiment shown in FIG. 2 the permanent magnet is centered between legs of the core.

The positioning transducer for the linear motor includes a scale 61 secured to projections 42 and 43. Moving scale 61 cooperates with a stationary sensor 62 that provides electrical signals indicating the actual position of the carriage. The positioning tranducer can be of several known types including capacitive, magnetic, or optical.

The magnet carriage can be secured to move any desired object. In the illustrative embodiment of FIG. 1 the carriage is shown secured to the read/write head assembly for a flexible magnetic disk drive. The head assembly is mounted on a support block 72 secured to projections 44 and 45 as, for example, with adhesive. The lower portion of the read/write head 76 is molded into a lower head support 74 and the upper portion of the upper portion of the read/write head is molded into an upper head support 78. The upper head support is pivotally mounted relative to lower support 74. The read/write heads are electrically connected to the electronic reading and recording control circuits via leads 90 and 92. The upper and lower head portions can be separated sufficiently to slide over the edge of a magnetic disk and to engage the disk in the recording track area. The linear movement of the permanent magnet in the linear motor provides movement of the head assembly so that the read/write heads can be moved from track to track on the disk.

Figure 4:
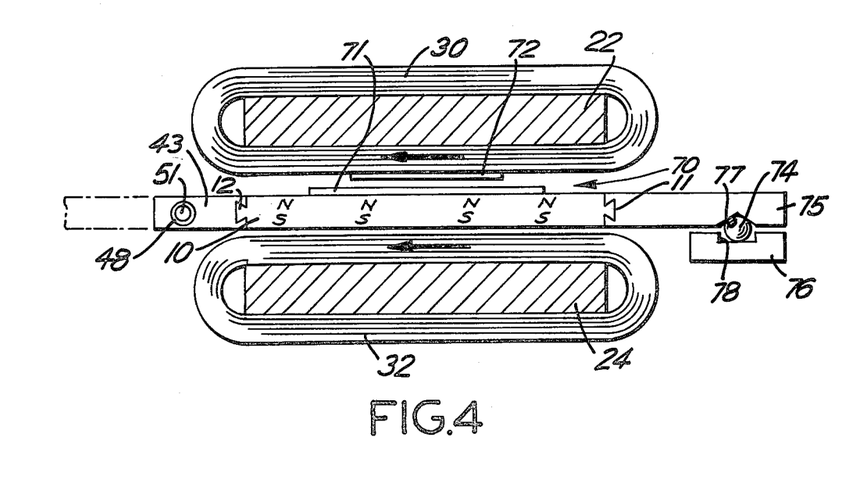
FIG. 4 is a cross-sectional view according to an alternative embodiment wherein the positioning transducer is located within the magnetic air gap and the carriage is supported by a preloaded ball bearing.

Another embodiment of the linear motor for use in the system according to this invention is shown in FIG. 4 and includes (1) a magnetic preloaded single rod carriage guide for the moving permanent magnet and (2) a positioning transducer directly attached to the moving permanent magnet and located within the air gap of the motor. This structure is also the subject of a separate patent application Ser. No. 376,655 filed on even date herewith now U.S. Pat. No. 4,415,821 issued Nov. 15, 1983.

The stator structure for this linear motor is similar to that previously described with respect to FIGS. 2 and 3 including a U shaped core with legs 22 and 24 with windings 30 and 32 surrounding the legs. For reasons to be explained hereinafter, permanent magnet 10 in this embodiment is closer to lower leg 24 rather than being centered between the legs of the core.

In this embodiment a position transducer 70 is located within the motor air gap and includes moving element 71 secured directly to the magnet and a stator element 72 secured to the surface of winding 30. The transducer elements are in the form of conductive patterns on the surface of a thin substrate such as may be produced using printed circuit techniques. The substrates bearing the conductor patterns are secured such as by adhesive. The stator and moving patterns are in the form of a similarly shaped capacitive plates interconnected by interleaved comb-like patterns. Relative movement between the elements of the transducer varies the capacitive coupling and, hence, position can be sensed in accordance with the amount of energy coupled between the elements. Such capacitively coupled position transducers are available from Farrand Industries, Inc., Valhalla, N.Y. It has been found that although the transducer is electrical in its operation, the transducer is virtually unaffected by the magnetic fields of the motor and can therefore be located within the motor air gap.

In actual practice the transducer elements can be very thin and take up very little air gap space. Preferably, in a linear motor arrangement where the permanent magnet is offset from the center, the transducer is located in the larger air gap which, in FIG. 4, is air gap between permanent magnet 10 and leg 22.

In the FIG. 4 embodiment the carriage for the permanent magnet includes only the one guide rod 51 which largely eliminates alignment and skewing problems often experienced with parallel guide rod arrangments. Support for the magnet on the side opposite the guide rod is provided by a ball bearing 74. A bearing support plate 75 is secured to magnet 10 by means of a dovetail slot which cooperates with projection 11 on the side of the magnet. A V-shaped groove 77 is machined into the lower suface of support 75 and is dimensioned to provide a race for ballbearing 74. A stationary bearing support 76 is machined to provide a recessed bearing surface 78.

With this bearing arrangement magnet 10 is intentionally located off center closer to leg 24 of the magnet core so that there is always a net magnetic pull of the magnet carriage downwardly toward leg 24. This downward force maintains bearing plate 75 in contact with the ball bearing so that the ball bearing cannot fall out. Thus, the motor elements themselves are utilized to provide a preloading force for maintaining the bearing.

The carriage structure with a single guide rod and ball bearing combination reduces friction and eliminates alignment and skewing problems often encountered with parallel guide rods. Furthermore, by magnetically preloading the bearing utilizing the elements of the motor itself the arrangement provides an effective ball bearing support without the need for the usual ball retaining structures.

Figure 5:
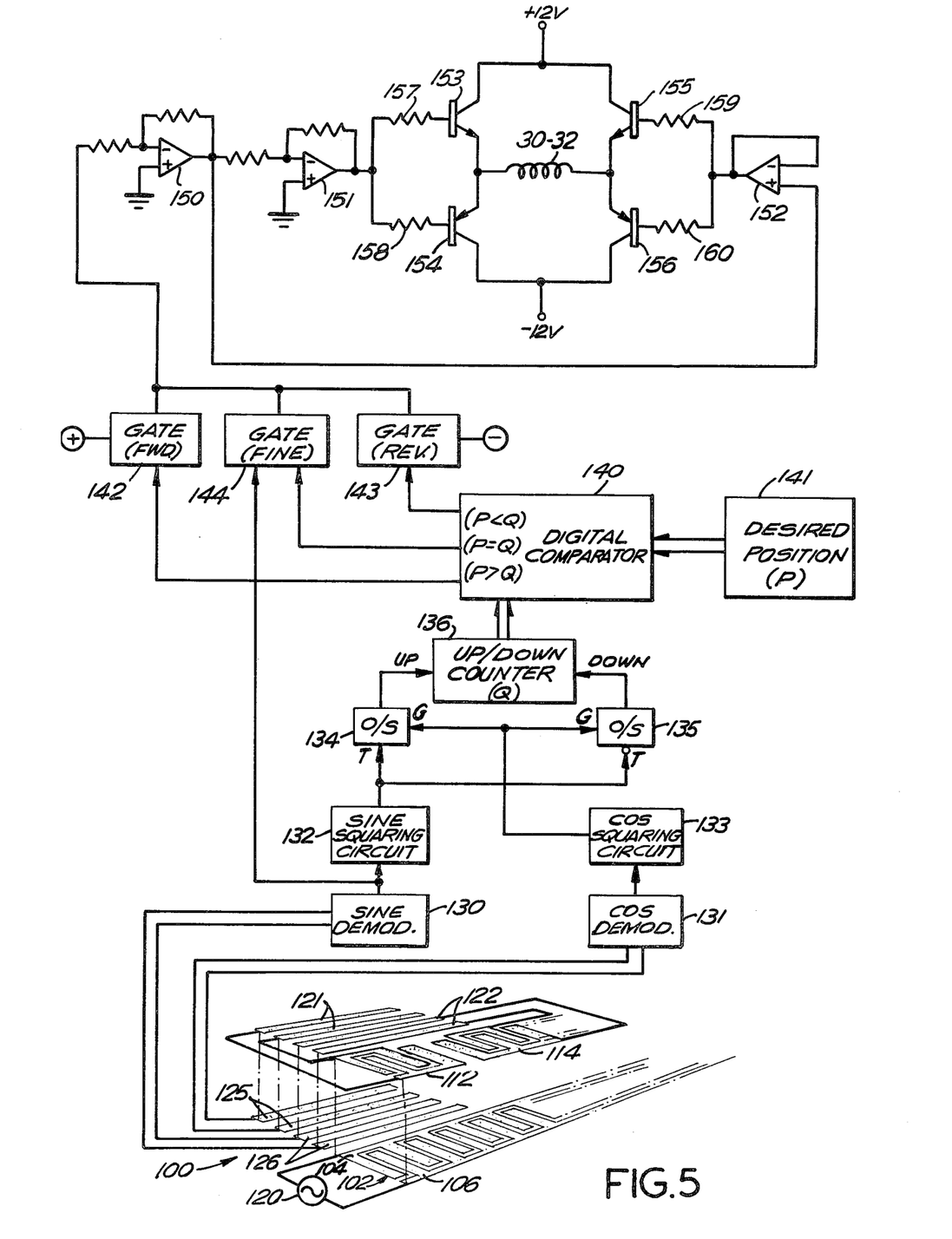
FIG. 5 is a schematic diagram of the control system in accordance with a preferred embodiment of the invention.

The servo loop control circuit for the linear positioning system according to this invention is shown in FIG. 5. The positioning transducer 100 is of the high gain Inductosyn type available from Farrand Industries, Inc., Valhalla, N.Y. previously mentioned with respect to FIG. 4. The transducer operation is based on the capacitive coupling between closely spaced stator and moving capacitive plate elements. The stationary pattern 102 consists of interleaved comb-like patterns 104–106, the teeth of the combs forming the individual capacitive plates. The pitch of the pattern is the distance between centers of the teeth of the same comb-like pattern, i.e., the distance required for pattern repetition. The moving conductor patterns are similar to the stationary patterns and have the same pitch. However, cosine pattern 114 is displaced by ¼ pitch relative to sine pattern 112. The stationary pattern must be at least equal in length to the distance moved by magnet 10 plus the length of the moving pattern of the transducer. The moving elements can be relatively short including only a few teeth on each of the comb-like pattern elements.

Although for clarity of illustration, the stationary and moving elements of transducer 100 are shown with substantial separation, in actual practice the elements are as close together as is reasonably possible since this separation affects positioning accuracy of the transducer. If the system is used in a disk drive to position read/write heads, the pitch of the transducer is preferably equal to the track spacing on the disk which can be on the order of 0.03 inches. The separation between the moving and stationary elements of the transducer should be less than ½ of the pitch of the pattern.

The elements of stationary pattern 102 are connected to oscillator 120 which provides a suitable energizing signal at a frequency of, for example, 100 kilohertz. Sine pattern 112 is connected to a parallel set of moving conductors 121 and cosine pattern 114 is similarly connected to a parallel set of moving conductors 112. Moving conductors 121 and 122 are aligned with stationary conductors 125 and 126 so as to couple the sine and cosine signals from the moving pattern back to the stationary pattern.

When the stationary pattern is energized and the moving pattern is centered over the stationary pattern there is a maximum coupling of energy and signal transfer between the capacitive plates of the patterns. When the moving pattern moves by ½ pitch, plates of the comb-like patterns are again aligned but with plates connected to the opposite sides of the pattern so that there is again maximum coupling but of a reversed polarity. At the ¼ and ¾ pitch alignments there is minimum coupling or signal transfer. If the moving element travels at a uniform speed, the signal amplitude in the sine and cosine patterns 112 and 114 varies to provide modulated sine and cosine signals (designated "sine" and "cos") as shown Q in the upper two traces of FIG. 6. The signals from patterns 112 and 114 which are amplitude modulated in accordance with the moving pattern positioning are coupled to stationary conductors 125 and 126 via moving conductors 121 and 122.

Conductors 125 and 126 are connected to sine demodulating circuit 130 and cosine demodulating circuit 131, respectively, which in turn are connected to sine and cosine squaring circuits 132 and 133. The signals produced by the demodulation circuits are shown in the FIG. 6 as the "sine demod." and "cos demod." signals and correspond to the amplitude envelope of the modulated signals. The amplitude of these signals varies in accordance with the relative position between the elements of the moving and stationary patterns of the transducer. The demodulated signals are supplied to the squaring circuits which produce a positive output of a predetermined amplitude whenever the input is positive and a negative output of a predetermined amplitude whenever the input is negative. The squared signals from the sine and cosine squaring circuits are shown in the lower traces in FIG. 6 designated "sine sq." and "cos. sq.".

The outputs of the squaring circuits are supplied to control one-shot multivibrator circuits 134 and 135. These circuits are responsive to a positive gate signal (gate input G) and a positive going transient (trigger input T) to provide a short output pulse. The output of cosine squaring circuit 133 is connected to the gate input G of one-shot circuits 134 and 135. The output of sine squaring circuit 132 is connected to the trigger input of one-shot circuit 134 and to an inverted trigger input of one-shot circuit 135.

Figure 6:
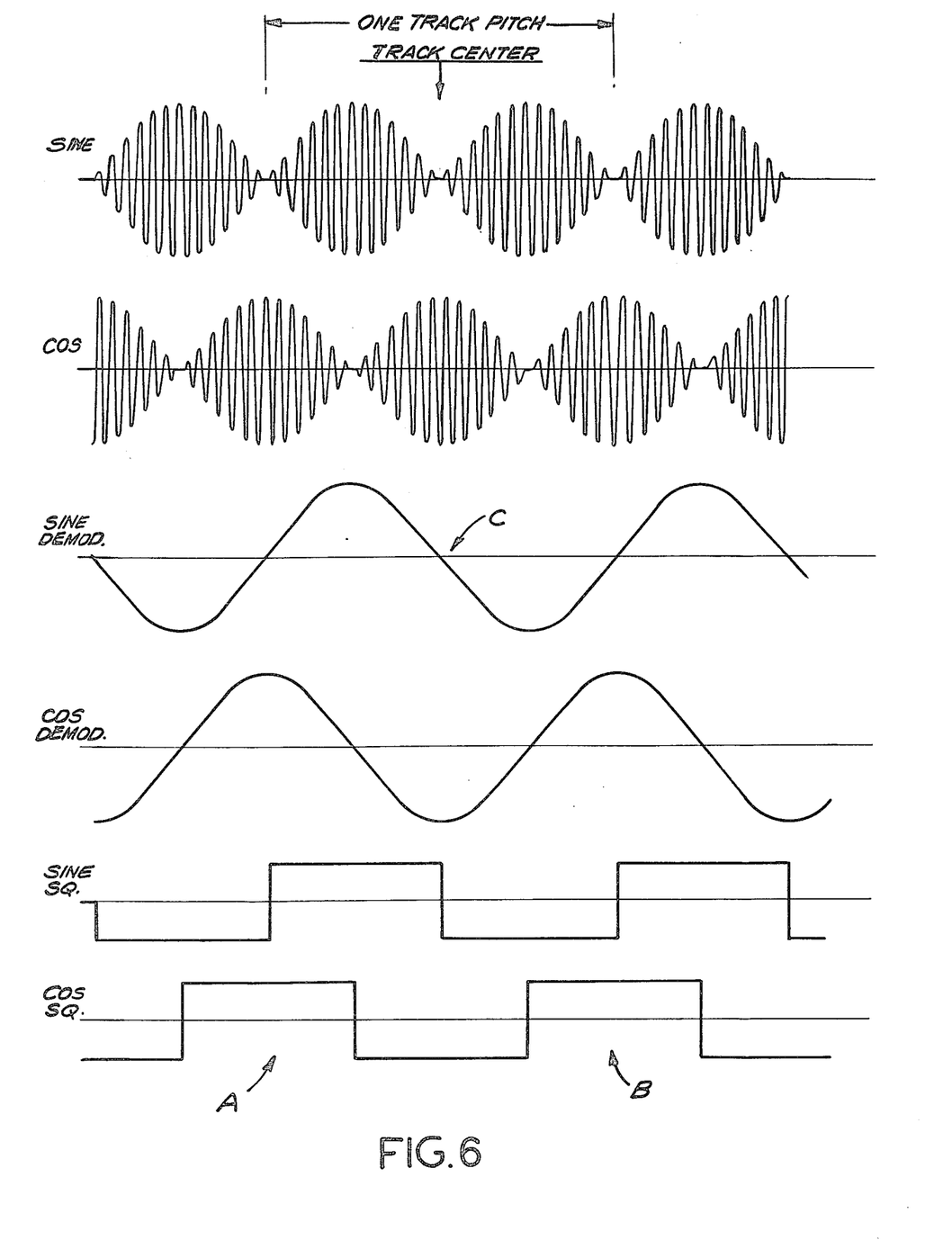
FIG. 6 is a timing diagram illustrating the signals appearing at various places in the system of FIG. 5.

If the movement of the moving pattern of the transducer is in a direction from left to right according to FIG. 6, then as point A is approached at the beginning of a track pitch, the output of the cosine squaring circuit is positive and therefore the one-shot circuits are conditioned to produce an output pulse. At point A the output of the sine squaring circuit changes from negative to positive and this positive transient triggers one shot circuit 134 to produce an output pulse. If, on the other hand, movement is in the opposite direction from right to left in FIG. 6, as point B is approached at the beginning of a track pitch, the output of cosine squaring circuit 133 is positive conditioning the one-shot circuits. At point B with this direction of movement the output of sine squaring circuit 132 goes from positive to negative and this negative transient applied to the inverted trigger input of one-shot circuit 135 produces an output pulse. Thus, with movement in one direction one-shot circuit 134 produces a pulse at the beginning of each track pitch whereas with movement in the opposite direction one-shot circuit 135 produces a pulse at the beginning of each track pitch.

An up/down counter 136 is used to maintain a count indicating the actual track position. The output of one-shot circuit 134 is supplied to the UP count input of counter 136 and the output of one-shot circuit 135 is connected to the DOWN count input. Thus, the count Q in counter 136 increases or decreases in accordance with the track movement of the linear motor.

A digital comparator 140 receives a digital word P indicative of the desired track position from a position input circuit 141 as well as the digital word Q from counter 136 indicating the actual track position. The outputs of comparator 140 are connected to control gate circuits 142-144. If the desired position P is greater than the actual position Q, then gate 142 is activated to provide movement in a forward direction at maximum speed. If the desired position P is less than the actual position Q then gate 143 is activated to provide movement in the reverse direction at maximum speed. If the desired position P is equal to the actual position Q, then gate 144 is activated to place the system in a fine positioning mode so that the linear motor moves to a position corresponding to the track center and provides force to maintain that position.

Windings 30-32 of the linear motor are connected into a four transistor bridge circuit shown in the upper portion of FIG. 5. The collector of an NPN power transistor 153 is connected to a +12 V supply and the emitter thereof is connected to one end of windings 30-33 whereas the other end of the windings is connected to the emitter of a complementary PNP transistor 156 having its collector connected to a −12 V source. Similarly, an NPN transistor 155 has its collector connected to the +12 V source and the emitter connected to one end of windings 30 and 32 with the other end of the windings connected to the emitter of a complementary PNP transistor 154 having its collector connected to the −12 V source. If transistors 153 and 156 are conductive, current flows through windings 30-32 in one direction whereas if transistors 155 and 154 are conductive, current flows through the windings in the opposite direction. Accordingly, by selectively energizing transistor pairs, current flow can be controlled through the windings in a desired direction to achieve linear movement of the motor in a desired direction.

The outputs of gates 142-144 are connected to an operational amplifier 150. The output of amplifier 150 is connected to the bases of transistors 153-154 via an inverting amplifier 151 and base drive resistors 157 and 158. The output of amplifier 150 is also connected to the bases of transistors 155 and 156 via a noninverting drive amplifier 152 and base drive resistors 159 and 160. A positive output from amplifier 150 produces a positive signal at the bases of transistors 155 and 156 via amplifier 152 and a negative signal at the bases of transistors 153 and 154 via inverting amplifier 151 thereby rendering transistors 155 and 154 conductive. Similarly, a negative output from amplifier 150 applies a positive signal to transistors 153 and 154 and a negative signal to transistors 155 and 156 thereby rendering transistors 153 and 156 conductive. The degree of conduction of the transistors in the bridge depends on the amplitude of the signal at the output of amplifier 150.

Gate 142 is connected to a positive source whereas gate 143 is connected to a negative source. When gate 142 is ON, a positive signal is applied to amplifier 150 rendering one pair of transistors in the bridge circuit fully conductive and, hence, there is maximum current flow through motor windings 30-32 in one direction. On the other hand, when gate 143 is ON, a negative signal is supplied to amplifier 150 rendering the other pair of transistors in the bridge circuit fully conductive so that there is maximum current flow through motor windings 30-32 in the opposite direction.

If gate 144 is ON, the output of sine demodulator circuit 130 is gated through to amplifier 150. As can be seen by looking at the "sine demod." signal in FIG. 6, the demodulated signal output from circuit 130 becomes zero at point C corresponding to the center of the track. If the actual position is one side of track center, the signal is positive whereas if the actual position is on the other side of track center, the signal is negative. When applied to amplifier 150 the demodulated sine signal causes the winding to be energized in a direction driving the motor toward the center of the track with the magnitude of the drive signal diminishing as the center is reached. This signal also tends to hold the linear motor at the track center position since any movement off center is sensed by the position transducer and results in a restoring force.

In operation when a desired position is indicated by circuit 141, linear motor windings 30-32 are energized for movement at maximum speed toward the indicated track by activation of either circuit 142 or 143. Signals from the position transducer 100 as processed by circuits 130-135 produce pulses to adjust the count on counter 136 to maintain a current indication of the actual track position. When the desired track position is reached, the system shifts to a fine positioning mode by activating gate 144 which then positions the motor at the center of the track and holds the motor at the centered position.

Figure 7:
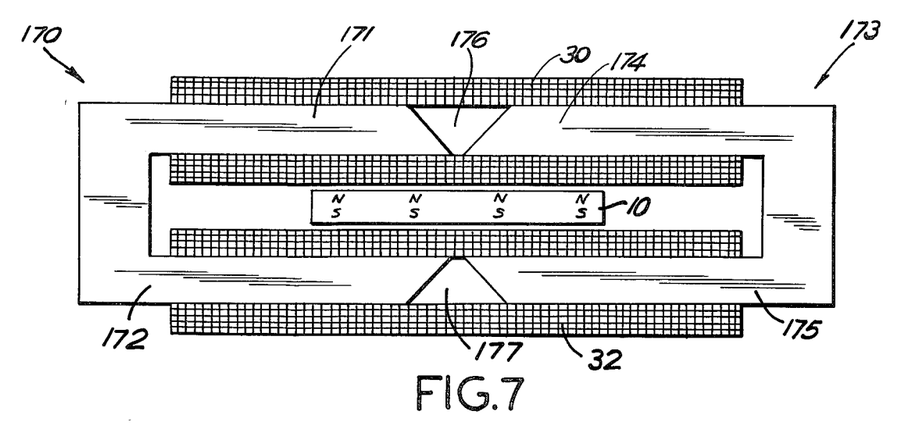
FIG. 7 is a longitudinal cross-section illustrating a stator structure according to another embodiment of the invention utilizing two stator core pieces.
Figure 8:
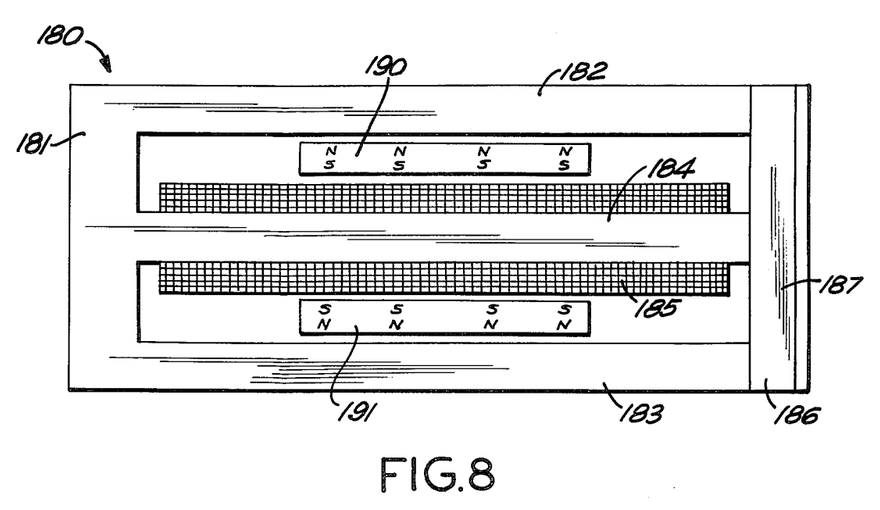
FIG. 8 is a longitudinal cross-section of a linear motor in accordance with still another embodiment utilizing one stator winding and two moving magnets.

Two additional embodiments of alternative stator structures are illustrated in FIGS. 7 and 8. The stator structure shown in FIG. 7 includes a two piece core 170–175. U-shaped core piece 170 includes parallel legs 171 and 172 and U-shaped core piece 173 includes parallel legs 174 and 175. The free ends of legs 171–172 and 174–175 are separated to provide air gaps 176 and 177, and are cut diagonally so that the air gaps increase with distance from moving magnet 10. Bobbin winding 30 surrounds legs 171 and 174 and bobbin winding 32 surrounds legs 172 and 175.

The flux from the magnet can flow from the north pole surface (upper surface as viewed in FIG. 7) across the air gap above the magnet through legs 171 and 172 and across the lower air gap to the south pole surface of the magnet, or can flow from the north pole surface, across the upper air gap, through legs 174 and 175 back to the south pole surface after crossing the lower air gap, or the flux may split and follow paths through legs 171–172 as well as through legs 174–175. The particular path for the flux depends on the position of magnet 10 at the time. As seen by the magnet, the air gaps for the flux path remain fairly uniform regardless of magnet position.

The magnetic flux generated by windings 30 and 32 circulates through core pieces 170 and 173 passing through legs 171–172, 174–175 and air gaps 176 and 177. Air gaps 176 and 177 are sufficiently large to prevent saturation of the core pieces.

In the arrangement shown in FIG. 7 there is symmetry with respect to the center point of the magnet travel and, hence, less tendency for the magnet to move toward a particular preferred position. Also, this arrangment may be preferred in linear motors designed for relatively long magnet movements.

The stator structure shown in FIG. 8 includes a single winding 185 and two moving magnets 190 and 191. The magnetic core 180 is E-shaped and includes parallel legs 182–184 and a connecting bridge position 181. Core 180 is, in effect, two U-shaped cores. Bobbin winding 185 surrounds center leg 184. A magnetic plate 187 is located at the free ends of legs 182–184 but is separated therefrom by a non-magnetic spacer 186. Magnetic flux generated by winding 185 splits and follows a first path through leg 184, the upper part of bridge portion 181, leg 182 and plate 187 as well as a second path through leg 184, lower part of bridge portion 181, leg 183 and plate 187. Plate 187 reduces fringing fluxes and spacer 186 is sufficient to reduce winding flux to a level avoiding saturation in core 180.

The magnet flux of magnet 190 flows from the north pole surface (upper surface in FIG. 8), through leg 182, bridge portion 181, leg 184 and back to the south pole surface after crossing the air gap including the upper portion of winding 185. The magnetic flux of magnet 191 flows from the north pole surface (lower surface in FIG. 8) through leg 183, bridge portion 181, leg 184 and back to the south pole surface after crossing the air gap including the lower portion of winding 185. Current flow through the upper portion of winding 185 interacts with the magnetic flux of magnet 190 creating a force tending to move magnet 190 whereas current flow through the lower portion of winding 185 interacts with the magnetic flux of magnet 191 creating a force tending to move magnet 191.

Magnets 190 and 191 are mounted on a common carriage (not shown) so that the forces tending to move the magnets are additive. The arrangement shown in FIG. 8 has the advantage of requiring only a single winding and of making use of current flow through both the upper and lower portion of the winding.

While only few illustrative embodiments have been shown in detail, it should be obvious that there are other variations within the scope of this invention. The invention is more particularly defined in the appended claims.

We claim:

1. A linear positioning system comprising:
   a linear magnetic motor including
      a U shaped stator core of magnetic material, including parallel legs,
      a winding around at least one leg of said core,
      a permanent magnet movable parallel to said legs of said core and magnetized transversely so that flux of said magnet interacts with current flow through said winding to produce a force tending to move said magnet;
   a position transducer including
      a stationary element secured to said core,
      a movable element secured to said movable magnet,
      and means for producing an actual position signal indicative of the relative positions of said elements; and
   a control circuit
      responsive to an indication of a desired position for said movable magnet,
      responsive to said actual position signal, and
      operative to energize said winding with an energizing signal of a polarity for moving said magnet toward said desired position.

2. A linear positioning system according to claim 1 wherein said stationary element of said position sensor is secured to said stationary core by attachment to the surface of said winding around a leg of said core.

3. A linear positioning system according to claim 1 wherein said position transducer is capacitive.

4. A linear positioning system according to claim 3 wherein said capacitive position transducer is located within the air gap of said linear magnetic motor.

5. A linear positioning system according to claim 1 wherein said position transducer is optical.

6. A linear positioning system according to claim 1 wherein said position transducer is inductive.

7. A linear positioning system according to claim 1 wherein said linear magnetic motor includes two windings, one surrounding each leg of said core.

8. A linear positioning system according to claim 1 further compressing a second U-shaped core of magnetic material including parallel legs and a second winding, wherein each of said windings surrounds one leg of each of said cores, and wherein said leg of one of said cores is separated from said leg of the other of said cores by an air gap.

9. A linear positioning system according to claim 1 wherein said core further includes a third parallel leg to provide an E-shaped core, wherein said winding surrounds the center one of said legs of said core, and further comprising a second permanent magnet between said center leg and said third leg.

10. A linear positioning system comprising:
    a linear magnetic motor including
       a U-shaped stator core of magnetic material including parallel legs,
       a winding around at least one leg of said core, the conductors forming said winding being of a substantially magnetic material,
       a permanent magnet movable parallel to said legs of said core and magnetized transversely so that flux of said magnet interacts with current flow through said winding to produce a tending to move said magnet force;
a position sensor including
a stationary element secured to said core
a movable element secured to said movable magnet, and
means for producing an actual position signal indicative of the relative positions of said elements; and
a control circuit,
responsive to an indication of a desired position for said movable magnet,
responsive to said actual position signal, and
operative to energize said winding with an energizing signal of a polarity for moving said magnet toward said desired position.

11. A linear positioning system according to claim 10 wherein said conductors of said winding are made from iron.

12. A linear positioning system according to claim 10 wherein said conductors of said winding are copper clad iron.

13. A linear positioning system comprising:
a linear magnetic motor including,
a U-shaped stator core of magnetic material including parallel legs,
a winding around at least one leg of said core,
a permanent magnet movable parallel to said legs of said core and magnetized transversely so that flux of said magnet interacts with current flow through said winding to produce a tending to move side magnet force;
a position transducer including
a stationary element secured to said core,
a movable element secured to said movable magnet, and
means for producing an actual position signal indicative of the relative positions of said elements; and
a control circuit responsive to said actual position signal and an indication of a desired position and including
a course positioning circuit connected to energize said winding for movement of said motor at maximum speed toward said desired position when said desired position is different from said actual position, and
a fine positioning circuit connected to energize said winding for fine positioning of said motor when said actual position is the same as said desired position.

14. A linear positioning system according to claim 13 wherein said position transducer is capacitive.

15. A linear positioning system according to claim 13 for positioning a read/write head on a multitrack disk drive wherein said position transducer is capacitive having a repetition pitch pattern corresponding to the recording tracks of the disk drive.

16. A linear positioning system for positioning a read/write head of a multitrack magnetic disk drive according to an indicated desired track position comprising:
a linear motor for positioning the head, said motor including a winding for causing said motor to move in a direction depending on the polarity of energization thereof;
a position transducer attached to said motor to provide a position signal indicating the position of the head, said position signal including
a transition corresponding to each track boundary crossing, and
an amplitude increase with distance from track center at least in areas near the track center; and
a position control circuit including
a counter connected to said position transducer and being operative to change count in response to each of said transitions of said position signal to maintain a count of the actual position of said head,
a forward/reverse drive circuit means connected to energize said winding, said drive circuit being connected to said counter and operative to cause said motor to move toward the track position corresponding to the desired track position when said actual track position, and
connected to said position transducer and a fine positioning circuit means responsive to said amplitude of said position signal, said fine positioning circuit being operatively connected to said winding so that said motor moves toward the track center when said actual track position is the same as said desired track position.

17. A linear positioning system according to claim 16 wherein said position transducer is capacitive.

18. A linear positioning system according to claim 16 wherein said position signal includes a sinusoidal component, said transition is a polarity change of said sinusoidal component.

* * * * *